(12) United States Patent
Sakatani et al.

(10) Patent No.: US 6,538,771 B1
(45) Date of Patent: *Mar. 25, 2003

(54) IMAGE PROCESSOR

(75) Inventors: Kazuomi Sakatani, Toyohashi (JP); Shoji Imaizumi, Shinshiro (JP); Junji Nishigaki, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,239

(22) Filed: Jan. 20, 1998

(30) Foreign Application Priority Data

Jan. 21, 1997 (JP) .............................. 9-008383
Jan. 21, 1997 (JP) .............................. 9-008386

(51) Int. Cl.$^7$ ..................... H04N 1/405; H04N 1/411; G06T 9/00
(52) U.S. Cl. ..................... 358/2.1; 358/3.06; 358/3.08; 358/3.13; 382/235; 382/237
(58) Field of Search ............................... 382/237, 235, 382/232, 251, 238, 270; 358/455, 456, 429, 433, 1.9, 426, 3.01, 3.06, 3.13, 3.12, 2.1, 3.08

(56) References Cited

U.S. PATENT DOCUMENTS

| | | | | |
|---|---|---|---|---|
| 4,972,502 A | * | 11/1990 | Katsuta et al. | 382/237 |
| 5,282,059 A | * | 1/1994 | Fukushima et al. | 358/456 |
| 5,319,471 A | * | 6/1994 | Takei et al. | 358/426 |
| 5,416,606 A | * | 5/1995 | Katayama et al. | 382/232 |
| 5,524,067 A | * | 6/1996 | Miyake et al. | 382/239 |
| 5,673,116 A | * | 9/1997 | Fukushima | 358/298 |
| 5,701,364 A | * | 12/1997 | Kanno | 382/235 |
| 5,742,704 A | * | 4/1998 | Suzuki et al. | 382/232 |
| 5,801,841 A | * | 9/1998 | Susuki | 382/232 |
| 5,838,455 A | | 11/1998 | Imaizumi et al. | |
| 5,867,612 A | * | 2/1999 | Roboson | 382/235 |
| 5,872,874 A | * | 2/1999 | Natarajan | 382/235 |
| 6,047,087 A | * | 4/2000 | Imaizumi et al. | 382/232 |

OTHER PUBLICATIONS

R. C. Gonzales et al, "Digital Image Processing", Addison–Wesley Publishing Company, Mar. 24, 1992, pp. 309–322.*
Gray, R.M., Lecture Notes for EE372: Quantization and Data Compression [online], Spring 2000–2001, Stanford University, Stanford, CA [retrieved on May 16, 2002]. Retrieved from the Internet: <http://www.stanford.edu/class/ee372/intro4.pdf> Topic 1, Introduction, frames 1–43.
Gray, R.M., Lecture Notes for EE372: Quantization and Data Compression [online], Spring 2000–2001, Stanford University, Stanford, CA [retrieved on May 16, 2002]. Retrieved from the Internet: <http://www.stanford.edu/class/ee372/scalar4.pdf> Topic 2, Scalar Quantization, frames 44–225.

* cited by examiner

*Primary Examiner*—Scott Rogers
(74) *Attorney, Agent, or Firm*—Burns, Doane, Swecker & Mathis, LLP

(57) ABSTRACT

In an image processor, multi-level image data are divided into blocks, and compressed in the unit of block. The compressed multi-level image data of a block are converted to compressed bi-level image data without expanding the multi-level image data. For example, the compressed multi-level image data on an image of uniform density are converted to compressed bi-level image data expressed with area gradation. In another image processor, the compressed multi-level image data of a block are converted to compressed multi-level image data, without expanding the multi-level image data. For example, the compressed multi-level image data on an image of bi-level image expressed with area gradation are converted to compressed multi-level image data of a half-tone image.

18 Claims, 12 Drawing Sheets

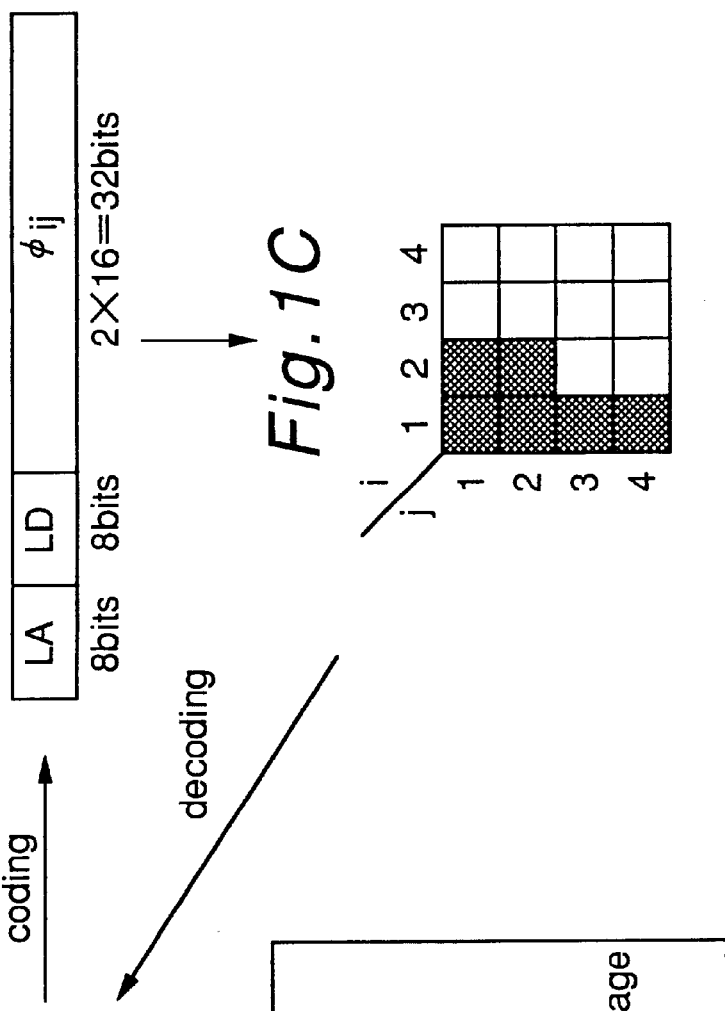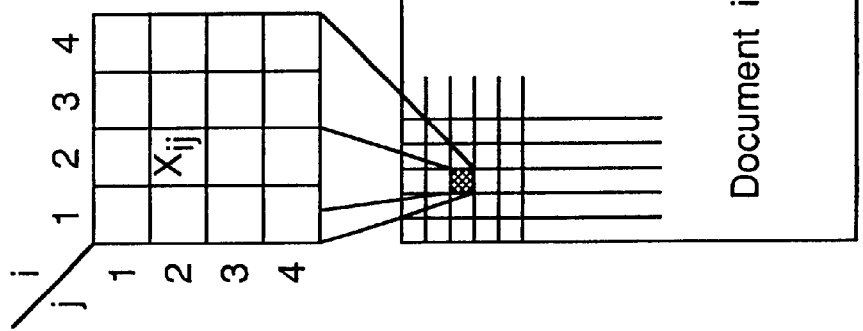

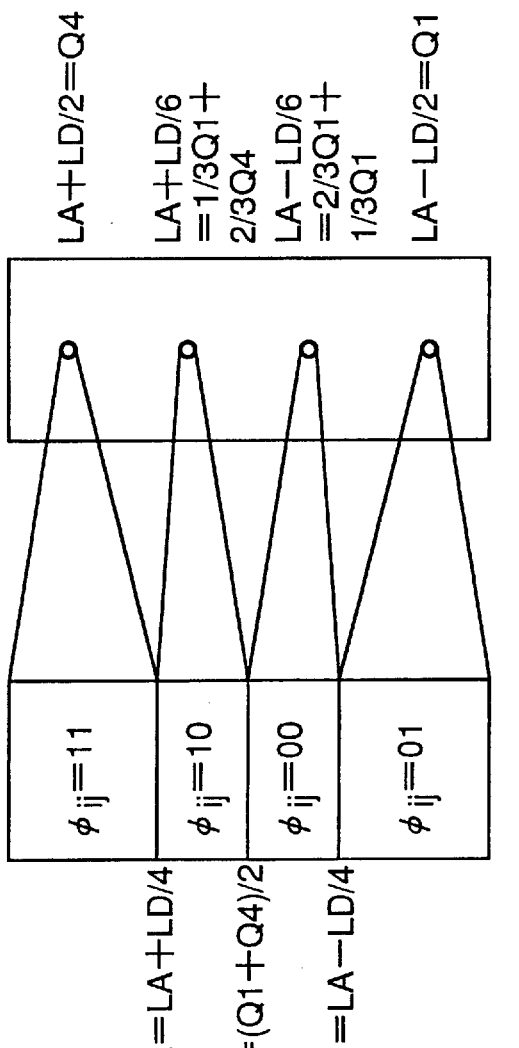
Fig. 2A Extraction of features
Fig. 2B Code assignment
Fig. 2C Decoded data

Fig.6

| LA | Dither pattern PTn | Data after GBTC |||
|---|---|---|---|---|
| | | LA | LD | $\phi_{ij}$ |
| $0 \leq LA < 15$ | PT0 | 0 | 0 | |
| $15 \leq LA < 47$ | PT1 | 127 | 255 | |
| $47 \leq LA < 79$ | PT2 | 127 | 255 | |
| $79 \leq LA < 111$ | PT3 | 127 | 255 | |
| $111 \leq LA < 143$ | PT4 | 127 | 255 | |
| $143 \leq LA < 175$ | PT5 | 127 | 255 | |
| $175 \leq LA < 207$ | PT6 | 127 | 255 | |
| $207 \leq LA < 239$ | PT7 | 127 | 255 | |
| $239 \leq LA \leq 255$ | PT8 | 255 | 0 | |

Fig.9

| Dither pattern $X_{ij}$ | $\phi_{ij}$ | LA | LD | Half-tone image $X_{ij}$ | $\phi_{ij}$ | LA | LD |
|---|---|---|---|---|---|---|---|
| | | 0 | 0 | | | 0 | 0 |
| | | 127 | 255 | | | 31 | 0 |
| | | 127 | 255 | | | 63 | 0 |
| | | 127 | 255 | | | 95 | 0 |
| | | 127 | 255 | | | 127 | 0 |
| | | 127 | 255 | | | 159 | 0 |
| | | 127 | 255 | | | 191 | 0 |
| | | 127 | 255 | | | 223 | 0 |
| | | 255 | 0 | | | 255 | 0 |

Fig.11

| Dither pattern | | | | Character pattern | | | |
|---|---|---|---|---|---|---|---|
| Pattern | Left | Right | Dif. | Pattern | Left | Right | Dif. |
| | Top | Bottom | Dif. | | Top | Bottom | Dif. |
| ▦ | 1 | 1 | 0 | ▦ | 2 | 0 | 2 |
| | 1 | 1 | 0 | | 2 | 0 | 2 |
| ▦ | 2 | 2 | 0 | ▦ | 4 | 0 | 4 |
| | 2 | 2 | 0 | | 3 | 1 | 2 |
| ▦ | 3 | 3 | 0 | ▦ | 6 | 0 | 6 |
| | 3 | 3 | 0 | | 4 | 2 | 2 |
| ▦ | 4 | 4 | 0 | ▦ | 7 | 1 | 6 |
| | 4 | 4 | 0 | | 5 | 3 | 2 |
| ▦ | 5 | 5 | 0 | ▦ | 7 | 3 | 4 |
| | 5 | 5 | 0 | | 6 | 4 | 2 |
| ▦ | 6 | 6 | 0 | ▦ | 6 | 4 | 4 |
| | 6 | 6 | 0 | | 7 | 5 | 2 |
| ▦ | 7 | 7 | 0 | ▦ | 8 | 6 | 2 |
| | 7 | 7 | 0 | | 8 | 6 | 2 |

IMAGE PROCESSOR

This application claims priority under 35 U.S.C. §§119 and/or 365 to Patent Applications 9-8383 and 9-8386 filed in Japan on Jan. 21, 1997; the entire content of which is hereby incorporated by reference.

BACKGROUND OF THE INVENTION

1. Field of the Invention

This invention relates to an image processor such as a digital copying machine.

2. Description of Prior Art

This application is based on applications Nos. 9-8383 and 9-8386 filed in Japan, the content of which is incorporated hereinto by reference.

Multi-level image data are obtained by reading a document image in an image processor. For an image processor such as a digital copying machine using an electrophotographic process, it is known to convert such multi-level image data to bi-level image data so as to form an image on a paper according to the bi-level image data. For an image processor which transmits the bi-level image data to a monochromatic printer, it is also known that an image processor converts multi-level image data to bi-level image data.

In the above-mentioned image processing for binarizing multi-level image data, it is known that image data are sampled while multi-level image data of a document is read, and real time dither pattern process or error dispersion process is performed by using high speed calculation. However, this technique has a limit on the sampling number of image data according to the calculation speed. It is also known that after all the multi-level image data read on a document is stored in a memory, features used for binarization are extracted from the multi-level image data to be binarized.

However, this technique needs a memory of large storage capacity. Further, it takes a long calculation time because a large amount of data have to be processed at one time.

SUMMARY OF THE INVENTION

An object of this invention is to provide an image processor which converts a multi-level image data to a bi-level image fast with a simple structure.

Another object of this invention is to provide an image processor which converts a bi-level image to a multi-level image fast with a simple structure.

In one aspect of the invention of an image processor, multi-level image data are divided into blocks, and compressed in the unit of block. The compressed multi-level image data of a block are converted to compressed bi-level image data without expanding the multi-level image data. For example, the compressed multi-level image data on an image of uniform density are converted to compressed bi-level image data expressed with area gradation.

In a second aspect of the invention of an image processor, the compressed multi-level image data of a block are converted to compressed multi-level image data, without expanding the multi-level image data. For example, the compressed multi-level image data on an image of bi-level image expressed with area gradation are converted to compressed multi-level image data of a half-tone image.

An advantage of the present invention is that conversion from compressed multi-level image data to compressed bi-level image data can be performed in a short time with a memory of a smaller capacity.

Another advantage of the present invention is that conversion from compressed bi-level image data to compressed multi-level image data can be performed in a short time with a memory of a smaller capacity.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 1A, 1B and 1C are diagrams for illustrating a flow of the generalized block truncation coding;

FIGS. 2A, 2B and 2C are diagrams on coding and decoding in the generalized block truncation coding;

FIG. 6 is a diagram of dither patterns PTn ($0 \leq n \leq 8$), average information LA, gradation width index LD and code data $\phi_{ij}$;

FIG. 9 is a flowchart of half-tone pattern processing;

FIG. 11 is a diagram of the numbers of black pixels in the left, right, top and bottom side in a block and differences between them for dither patterns and character patterns.

DETAILED DESCRIPTION OF THE PREFERRED EMBODIMENTS

Figure 3:
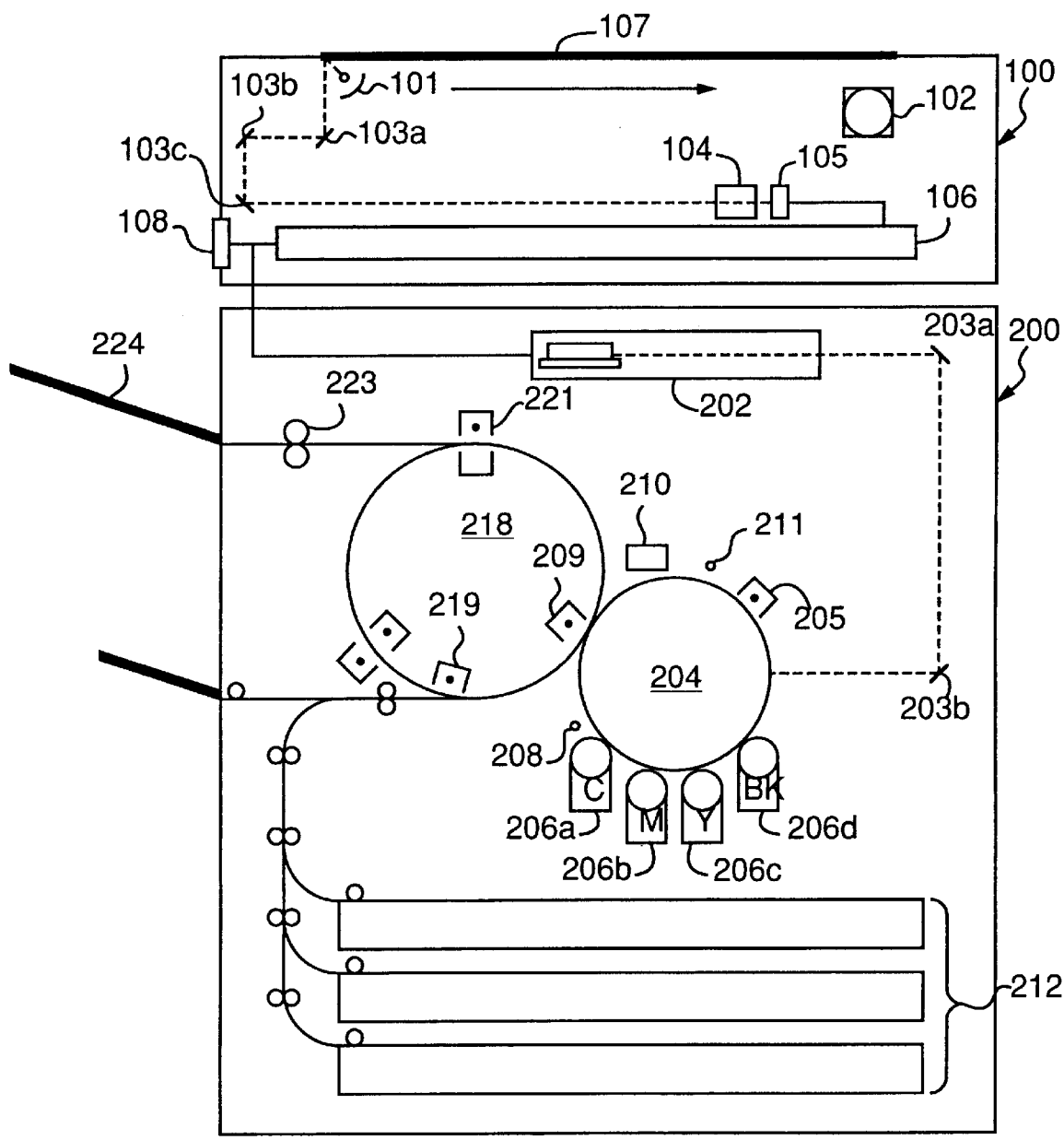
FIG. 3 is a sectional view of a digital copying machine of an embodiment of this invention.

Referring now to the drawings wherein like reference characters designate like or corresponding parts throughout the views, a digital copying machine of a first embodiment of the invention is explained. In the digital copying machine, multi-level image data read on a document are coded, and the compressed data are stored in a memory. In the first embodiment, the compressed multi-level image data are converted to compressed bi-level image data without expanding the multi-level image data.

In an example explained below, the compressed multi-level image data on an image of uniform density are converted to compressed data of a bi-level image expressed with area gradation such as a dither pattern, without expanding the compressed image data. Multi-level image data are divided into blocks, and features on image data of each block are determined. In the coding, a first feature which characterizes the distribution of the image data and a second feature which characterizes the average thereof are obtained from the multi-level image data, and these features are also stored with the code data. It is decided according to the first feature of the image data on the distribution thereof whether the image of a block is a bi-level image or not. When an image of a block of a constant density is detected, the coded image data thereof are converted to those of bi-level images expressed with area gradation such as dither patterns with reference to the second feature on the average of the image data. Thus, the compressed multi-level data of a block of a constant density are converted to those of bi-level images expressed with area gradation.

In this embodiment, image data read on a document are coded and decoded with a generalized block truncation coding (GBTC). As will be explained later in detail, image data on an image area of uniform density are binarized as bi-level images expressed with area gradation such as dither patterns by using gradation width index LD and average information LA which are two features obtained by generalized block truncation coding. In the following, coding with generalized block truncation coding is explained first, and the digital copying machine is explained next.

In generalized block truncation coding, multi-level image data of a document are divided into blocks each consisting of 4*4 pixel matrix. In each block, an average Q1 is calculated of data equal to or smaller than a parameter P1 determined by the data in the block, and another average Q4 is calculated of data equal to or larger than another parameter P2 determined by the data in the block where P1<P2. Then, average information LA is defined as a half of a sum of the averages Q1 and Q4, and gradation width index LD is defined as a difference between the averages Q1 and Q4. Then, by using the average information LA and the gradation width index LD, the image data of the pixels in the block are compressed to code data $\phi_{ij}$ by quantizing them with gradation levels the number of which is smaller than that of the image data.

Figure 4:
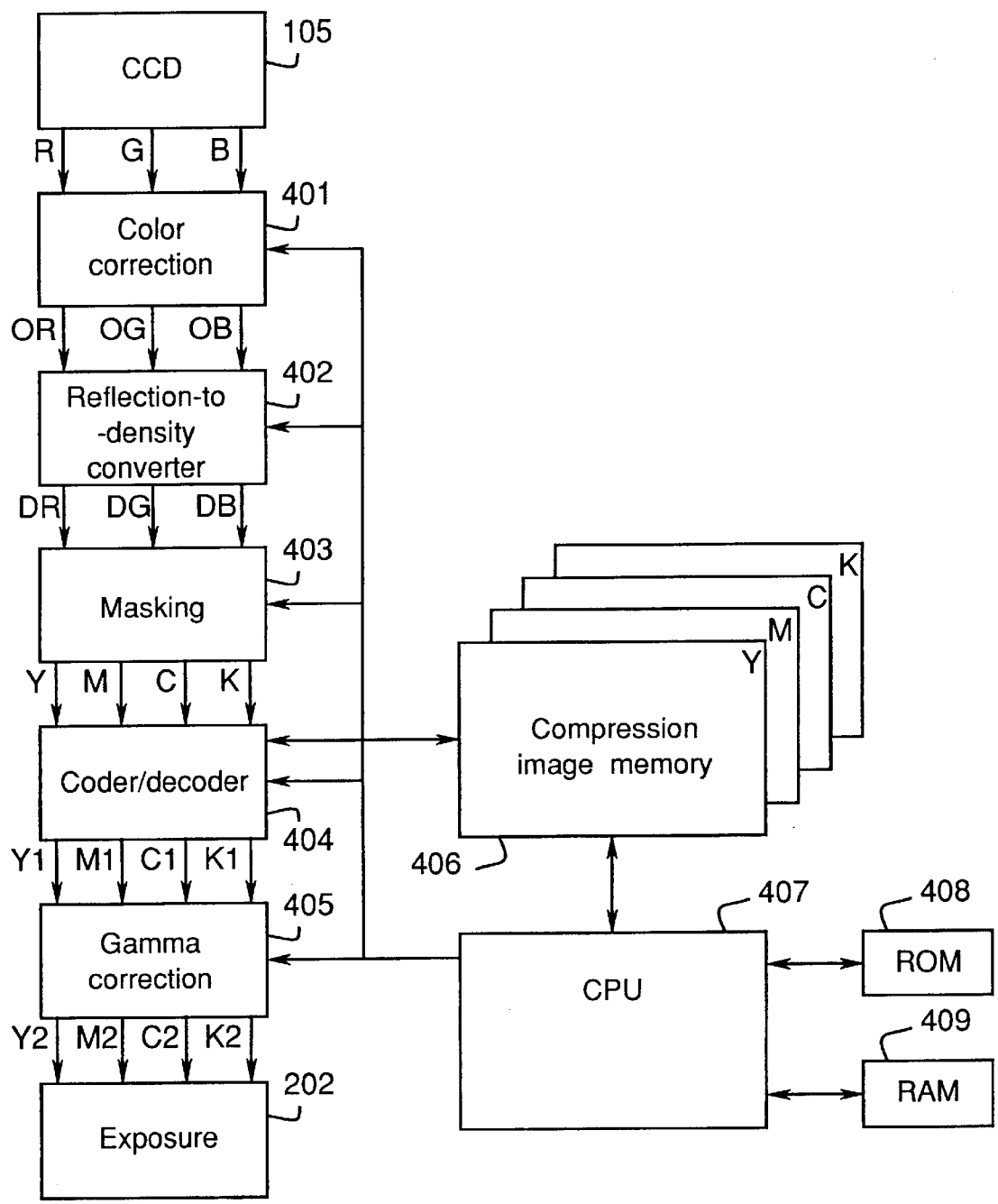
FIG. 4 is a block diagram of processing blocks in a read signal processor in the digital copying machine.

FIGS. 1A–IC show a coding/decoding flow in generalized block truncation coding performed in a coder/decoder 405 of the digital copying machine (refer to FIG. 4). As shown in FIG. 1A, multi-level image data of a document is extracted in the unit of a block of pixels $X_{ij}$. The size of each block is 4*4 pixels $X_{ij}$ where i and j denote column and row. Then, extracted image data for each block are coded, as explained later with reference to FIG. 2, with generalized block truncation coding by using features determined for each block of 4*4 pixel matrix. Then, as shown in FIG. 1B, 1-byte (or 8-bit) image data of 16 pixels, or 16 bytes (128 bits), are compressed to 6-byte code data consisting of a 1-byte average data LA, a 1-byte gradation width index LD and 2-bit code data $\phi_{ij}$ (four gradation levels) for the 16 pixels. The data LA and LD are determined according to features determined from the image data in each block. Thus, as shown in FIG. 1B, an amount of data is reduced to 6 bytes or 48 bits. FIG. 1C shows that the amount of the code data corresponds to that of image data of six pixels before coding (shaded pixels in FIG. 1C). Thus, the image data are compressed to ⅜ of the amount thereof. The coded data shown in FIG. 1B are decoded by setting 1-byte image data for each 2-bit code data $\phi_{ij}$ based on the features LA and LD.

In the embodiments explained below, image data of a document is extracted in the unit of 4*4 matrix block. However, the invention is not limited to blocks of 4*4 pixel matrix, and blocks of, for example, 3*3 pixels or 6*6 pixels may by used. Further, in the embodiments explained below, image data of 256 gradation levels is coded to the code data of four gradation levels, but it may be, for example, eight.

Further, though generalized block truncation coding is used in this embodiment, coding and decoding of the image data is not limited to generalized block truncation coding. As explained below, in the binarization which is a characteristic of the copying machine of this embodiment, an image of uniform density is detected based on a feature which represents distribution of pixel data (the gradation with index LD in the case of generalized block truncation coding), and the multi-level image of uniform density is converted to bi-level image with area gradation. The size of block and the number of gradation levels are not relevant to the binarization.

FIGS. 2A, 2B and 2C are diagrams for illustrating coding and decoding in generalized block truncation coding. From multi-level image data extracted in the unit of block of 4*4 pixel matrix, features necessary for coding are extracted. The features are obtained by calculation explained below.

FIG. 2A shows a relation between the minimum $L_{max}$, the maximum $L_{min}$, parameters P1 and P2, and gradation width index LD. Each block of 4*4 pixels includes sixteen 8-bit image data, where the maximum $L_{max}$ and the minimum $L_{min}$ represent the maximum and the minimum of the image data in a block. As shown in FIG. 2A, the image data are divided into three groups by using the two parameters P1 and P2 which is larger than P1, both determined appropriately according to the image data in the block. The parameter P1 is a sum of the minimum $L_{min}$ and ¼ of a difference between $L_{max}$ and $L_{min}$, the parameter P2 is a sum of the minimum $L_{min}$ and ¾ of a difference between $L_{max}$ and $L_{min}$. That is, the parameters P1 and P2 are determined as follows:

$$P1 = (L_{max} + 3*L_{min})/4, \quad (1)$$

and $$P2 = (3*L_{max} + L_{min})/4. \quad (2)$$

Next, the first average Q1 is obtained on the image data of a group of the pixels having pixel data lower than the parameter P1, while the second average Q4 is obtained on the image data of a group of the pixels having pixel data larger than P2. Then, the average information LA and the gradation width index LD are determined as follows:

$$LA = (Q1 + Q4)/2, \quad (3)$$

and $$LD = Q4 - Q1. \quad (4)$$

Next, levels L1 and L2 used for quantization are determined as follows:

$$L1 = LA - LD/4, \quad (5)$$

and $$L2 = LA + LD/4. \quad (6)$$

Then, by using the three levels, L2, LA and L1, the 1-byte or 8-bit image data of 256 gradation levels in the block are quantized as 2-bit codes $\phi_{ij}$. FIG. 2B shows code data $\phi_{ij}$ for a pixel $X_{ij}$ for i-th column and j-th row where i, j=1, 2, 3 or 4.

Table 1 shows the code assignment for 1-byte data $X_{ij}$, to 2-bit code $\phi_{ij}$ at i-th column and j-th row. Then, the compressed data obtained with generalized block truncation coding for a block includes 2-bit code data $\phi_{ij}$ of 16 pixels (or 4 bytes), a 1-byte gradation width index LD and a 1-byte average data LA.

TABLE 1

Assignment of code data $\phi_{ij}$

| Range of 1-byte image data $X_{ij}$ | 2-bit code data $\phi_{ij}$ |
|---|---|
| $X_{ij} \leq L1$ | $\phi_{ij} = 01$ |
| $L1 < X_{ij} \leq LA$ | $\phi_{ij} = 00$ |
| $LA < X_{ij} \leq L2$ | $\phi_{ij} = 01$ |
| $L2 < X_{ij}$ | $\phi_{ij} = 11$ |

FIG. 2C shows decoding in generalized block truncation coding wherein the gradation width index LD and the average information LA are used to decode the code data $\phi_{ij}$. That is, as shown in Table 2, a 2-bit code data $\phi_{ij}$ assigned for a pixel data $X_{ij}$ is converted to one of four values in 8-bit gradation levels. Then, the data $X_{ij}$ of 256 gradation levels are converted to data of four levels in 256 levels.

TABLE 2

Assignment of $\phi_{ij}$ to four levels

| 2-bit code data $\phi_{ij}$ for pixel data $X_{ij}$ | Gradation data of four levels in 256 gradation levels |
|---|---|
| $\phi_{ij} = 01$ | $Y_{ij} = LA - LD/2 = Q1$ |
| $\phi_{ij} = 00$ | $Y_{ij} = LA - LD/6 = 2/3 Q1 + 1/3 Q4$ |
| $\phi_{ij} = 10$ | $Y_{ij} = LA + LD/6 = 1/3 Q1 + 2/3 Q4$ |
| $\phi_{ij} = 11$ | $Y_{ij} = LA + LD/2 = Q4$ |

In generalized block truncation coding, the parameters Q1 and Q4 are recovered completely from the average information LA and the gradation width index LD included in the coded data. Therefore, a bi-level image such as a dither pattern having a black part equal to or smaller than the parameter P1 and a white part equal to or larger than the parameter P2 (monochromatic bi-level image) can be completely reproduced from the code data.

The coding and decoding explained above are performed in a hardware circuit in the embodiments. However, they can be performed by using a computer program according to the above-mentioned algorithm.

Though generalized block truncation coding is used in the embodiment, coding is not limited to generalized block truncation coding. Any coding may be used if a first feature which characterizes the distribution of the image data and a second feature which characterizes the average thereof are stored with the code data. If it is decided according to the first feature of the image data on the distribution thereof that the image of a block is a bi-level image, the coded data thereof are converted to those of bi-level images, without expanding the compressed image data. Thus, the multi-level data of a block of a bi-level image density are converted to is bi-level data when they are reproduced on a sheet of paper.

FIG. 3 is a sectional view of the copying machine of the embodiment of this invention. This copying machine includes an image reader 100 and a printer 200.

In the image reader 100 for reading color image data of a document, a document is put on a platen glass 107 and illuminated with a lamp 101. A light reflected from a document face is guided through mirrors 103a, 103b and 103c and a lens 104 and is focused onto a linear charge coupled device (CCD) sensor 105. The exposure lamp 101 and the mirror 103a are moved by a scanner motor 102 in the subscan direction (the direction represented with an arrow) at a speed V corresponding to the copy magnification. Thus, the document is scanned on the whole face. The mirrors 103b and 103c are moved in the same direction at a speed of V/2 according to the movement of the exposure lamp 101 and the mirror 103a. The CCD sensor 105 converts the incident light to analog, electrical signals R (red), G (green) and B (blue) of three colors. A read signal processor 106 corrects the electrical signals and converts them to 8-bit gradation data of Y (yellow), M (magenta), C (cyan), and K (black). The gradation data is supplied to an external input/output port 108 and to the printer 200.

In the printer 200, an exposure device 202 receives the data and generates a signal for driving a laser diode (not shown) provided therein to emit a laser beam. The laser beam generated according to the signal exposes a rotating photoconductor drum 204 through a mirror 203. For every copying operation, before the exposure, the photoconductor drum 204 is illuminated with an eraser lamp 211 and is uniformly charged with a sensitizing charger 205. When the photoconductor drum 204 is exposed under such a condition, an electrostatic latent image of the document is formed thereon. It is developed with a toner development unit 206a of cyan which is first selected in the toner development units 206a–206d for cyan, magenta, yellow and black. On the other hand, a sheet of paper of an appropriate size is supplied from a paper cassette 212 and is absorbed onto a transfer drum 218 electrostatically. The developed toner image of cyan is illuminated by a pretransfer eraser 208 to remove excess charges and is transferred onto the paper on the transfer drum 218 with a transfer charger 209. Next, one of the other development units of magenta, yellow and black is selected successively, and sensitizing, exposure and toner development for the photoconductor drum 204 are performed. Each toner image developed on the photoconductor drum 204 is overlapped on the paper successively. Then, the paper on which toner images of four colors are transferred is discharged by a charger 221 and is separated from the transfer drum 218. Then, the toner images on the paper are fixed with a fixing is roller 223, and the paper is carried to a tray 224.

FIG. 4 shows blocks in the read signal processor 106 controlled by a central processing unit (CPU) 407, which is connected to a read only memory (ROM) 408 for storing a control program and various tables and a random access memory 409 used as a working area. The CCD sensor 105 generates an analog electric signal in response to incident light from the document, converts the analog electric signal to a digital signal and performs shading correction thereon. A color correction processor 401 corrects the digital image data of three primary colors of red (R), green (G) and blue (B) received from the CCD sensor 105 to standard RGB image data OR, OG and OB specified in the NTSC standard, the high-density television standard or the like. The image data OR, OG and OB are data on reflectivity. A reflection-to-density converter 402 converts the image data OR, OG and OB to density data DR, DG and DB. A masking processor 403 converts the density data DR, DG and DB to gradation data C, M, Y and K of cyan, magenta, yellow and black of toners used in the copying machine. A coder/decoder 404 codes the gradation data C, M, Y, K with generalized block truncation coding to the above-mentioned code and writes them to a compression image memory 406 for the four colors.

As will be explained later in detail, a block which exists in an image area of uniform density is detected according to the gradation width index LD of the block which is written to the compression image memory 406. Then, the is gradation width index LD, the average information LA and the code data $\phi_{ij}$ of the block are rewritten to gradation width index LD, average information LA and code data $\phi_{ij}$ which are obtained with generalized block truncation coding on a bi-level image data of a dither pattern specified by the average information LA. Thus, an image area of uniform density is changed to a bi-level image when it is formed on a sheet of paper. (This is called as binarization or dither pattern processing.)

After the dither pattern processing by the CPU 407, the gradation width index LD, the average information LA and the code data $\phi_{ij}$ are read from the compression image memory 406 and decoded when necessary. Then, the decoded data are sent to a gamma correction processor 405. In the gamma correction processor 405, gradation correction is performed so that the density is reproduced linearly for the input image data C1, M1, Y1, K1. In the exposure device 202 in the printer 200, the signal for driving the laser diode is generated according to the image data C2, M2, Y2 and K2 received from the gamma correction processor 202.

Figure 5:
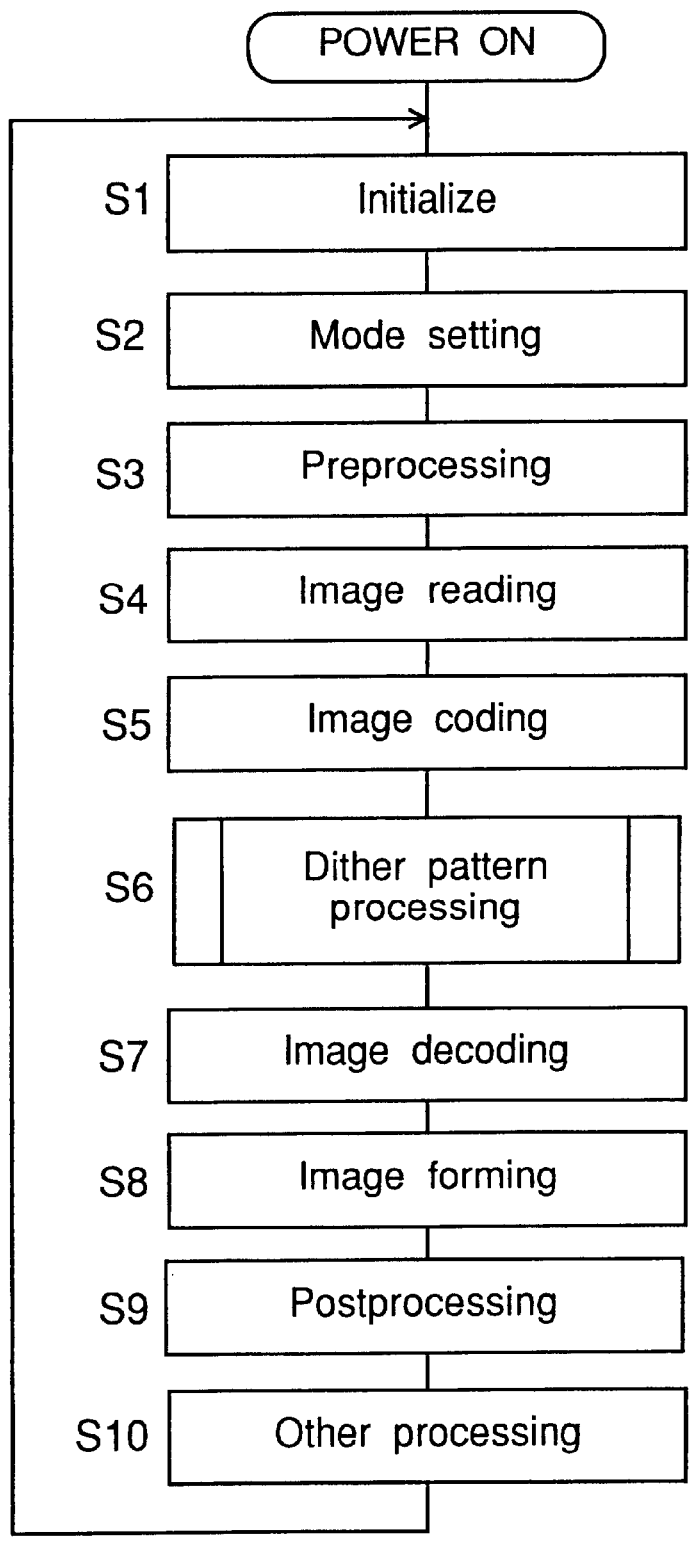
FIG. 5 is a main flowchart of image forming executed by a central processing unit in the digital copying machine.

FIG. 5 is a main flowchart of the image forming processing executed by the CPU 407. First, internal variables and the like used in the flow are initialized, and the elements in the copying machine are also initialized (step S1). Next, a copy mode set according to a key input by a user is received from an operational panel (not shown) provided at the top of the copying machine (step S2). Next, shading correction for image reading and preprocessing such as preparations of the elements for image forming are performed according to the copy mode (step S3). Next, image data of a document put on the platen glass 107 is read (step S4). Next, image data of the document is coded with generalized block truncation coding, and the code data are stored in the compression image memory 406 (step S5). This coding in this step means not the coding itself performed with a computer program, but processing for determining compression conditions and data processing after the compression. The processing itself of generalized block truncation coding is performed by a hardware circuit in the copying machine. Then, a block belonging to a uniform density image is detected according to the gradation width index LD obtained by generalized block truncation coding, and the uniform density image in the detected block is replaced with a dither pattern in correspondence to the density (step S6), as will be explained later in detail. After this dither pattern processing, the code data are read from the compression image memory 406 and recovered to image data by decoding (step S7). Next, a series of image forming processes (a copy job) is controlled according to the decoded image data (step S8) The image forming processes include sensitizing, exposure and development for the photoconductor drum 204, transfer of a toner image onto a sheet of paper and fixing of the toner image. Thus, an image after the binarization is formed in a uniform density portion on a sheet of paper. Next, processings such as cleaning of the photoconductor 204 not related directly to the copy operation but necessary to maintain the conditions of the copying machine are performed (step S9). Finally, other processings such as temperature control of the fixing device 223 and communication control of the external input/output port 108 not related directly to the above-mentioned control are executed (step S10). Then, the flow returns to step S1 to repeat the above-mentioned steps S2–S10.

In the dither pattern processing (FIG. 5, step S6), a block which belongs to a uniform density image is detected according to the gradation width index LD obtained for each block in generalized block truncation coding. Then, gradation width index LD, average information LA and code data $\phi_{ij}$ of the detected block are replaced with gradation width index LD, average information LA and code data $\phi_{ij}$ obtained with generalized block truncation coding on a dither pattern image at a density specified with the average information LA. Thus, an image of a uniform density is binarized or represented as a dither pattern.

FIG. 6 shows a diagram for illustrating the dither pattern processing for a block of constant density. Dither patterns PTn ($0 \leq n \leq 8$) are specified in correspondence to the average information LA, or the dither pattern PT0–PT8 is selected according to the value of the average information LA. The gradation width index LD, the average information LA and the code data $\phi_{ij}$ shown in FIG. 6 are obtained with generalized block truncation coding for the bi-level image data of the dither patterns. Then, the gradation width index LD, the average information LA and the code data $\phi_{ij}$ of the block are changed to the counterparts shown in FIG. 6. When the code data of the block are decoded, the dither patterns are formed.

As explained above, because the dither pattern processing is performed based on the data obtained with generalized block truncation coding, a memory capacity of the compression image memory 406 needed for the processing is reduced to a ratio of 3/8 relative to that needed for storing all the image data. Further, because the memory capacity used for the dither pattern processing is smaller, the processing can be executed with a computer program without using a special hardware circuit.

Figure 7:
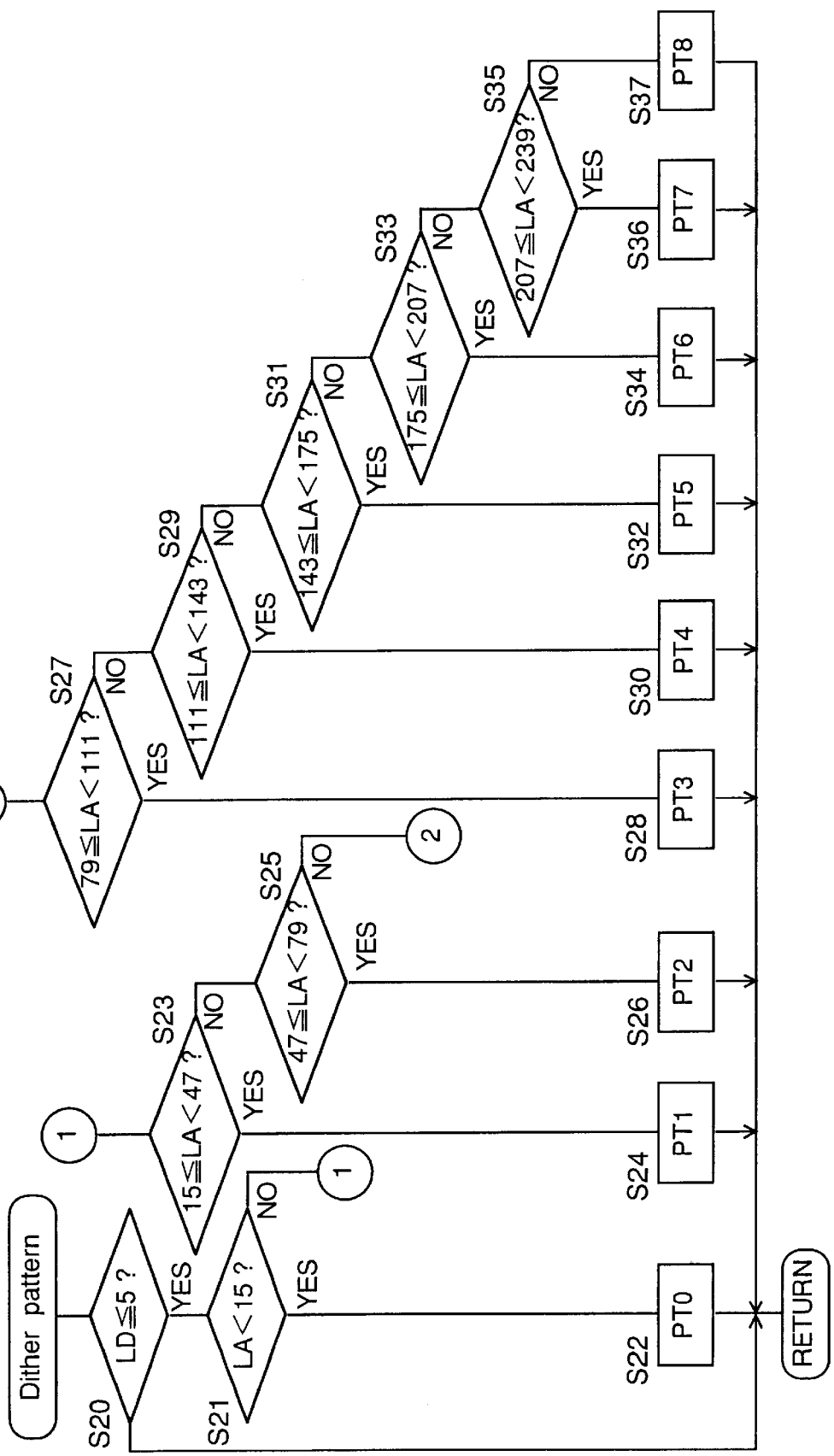
FIG. 7 is a flowchart of dither pattern processing.

FIG. 7 is a flowchart of the dither pattern processing (FIG. 5, step S6). If the value of gradation width index LD of a block is equal to or smaller than a reference value or 5 (YES at step S20), the block is decided to belong to an image of uniform density. This and other reference values are determined according to simulation. Next, if it is decided that the average information LA is smaller than 15 (YES at step S21), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT0 (step S22). The other dither patterns PT1–PT8 are determined similarly as follows. If it is decided that the average information LA is equal to or larger than 15 and smaller than 47 (YES at step S23), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT1 (step S24). If it is decided that the average information LA is equal to or larger than 47 and smaller than 79 (YES at step S25), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT2 (step S26). If it is decided that the average information LA is equal to or larger than 79 and smaller than 111 (YES at step S27), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT3 (step S28). If it is decided that the average information LA is equal to or larger than 111 and smaller than 143 (YES at step S29), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT4 (step S30). If it is decided that the average information LA is equal to or larger than 143 and smaller than 175 (YES at step S31), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT5 (step S32). If it is decided that the average information LA is equal to or larger than 175 and smaller than 207 (YES at step S33), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT6 (step S34). If it is decided that the average information LA is equal to or larger than 207 and smaller than 239 (YES at step S35), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT7 (step S36). If it is decided that the average information LA is equal to or larger than 239 (NO at step S35), the gradation width index LD, the average information LA and the code data $\phi_{ij}$ of the block are replaced with the gradation width index LD, the average information LA and the code data $\phi_{ij}$ obtained with generalized block truncation coding on bi-level image data of the dither pattern image PT8 (step S37).

In the above-mentioned example, density levels of uniform density image are expressed with (8+1)=9 gradations according to the value of average information LA. However, dither patterns of (16+1)=17 gradations or the like or a different type of area gradation techniques may also be used because a characteristic of the embodiment is that a uniform density area is detected according to the gradation width index determined according to distribution of the pixel data and that the code data in a detected area are changed to code data of dither patterns or the like which corresponds to the value of average information specified according to an average of the image data in the uniform density image area.

Next, a digital copying machine of a second embodiment of the invention is explained. The copying machine has the same structure as that of the first embodiment shown in FIGS. 3 and 4. However, the image processing thereof is different from that of the first embodiment. In the digital copying machine, multi-level image data read on a document are coded and the compressed data are stored in a memory. The multi-level image data are divided into blocks and compressed in the unit of block. The compressed bi-level image data of a block are converted to compressed multi-level image data without expanding the bi-level image data.

In an example explained below, the compressed multi-level image data on a bi-level image expressed with area gradation are converted to compressed multi-level image data of a half-tone image. In concrete, when image data expressed with area gradation with bi-levels are compressed with generalized block truncation coding, the image data are rewritten as code data which will be reproduced as a half-tone multi-level image for blocks decides to be bi-level images expressed with area gradation such as dither patterns. In this processing called as half-tone processing, features of the image of a block, that is, the gradation width index and the average information, are extracted from the coded data, and if they satisfy a predetermined condition, calculation is performed with use of the coded data, and the gradation width index, the average information and the code data are rewritten based on the calculation.

Figure 8:
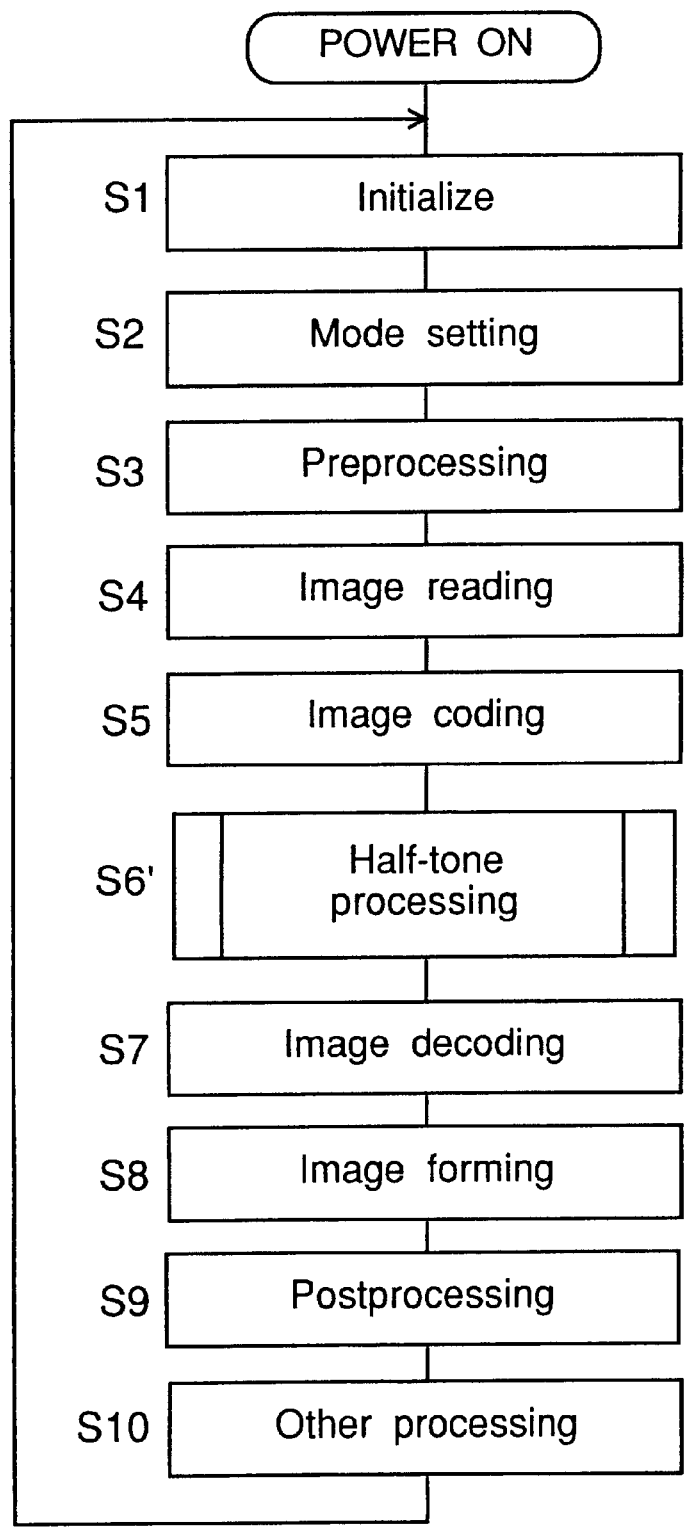
FIG. 8 is a main flowchart of image forming executed by a central processing unit in a digital copying machine of a second embodiment of the invention.

FIG. 8 is a main flowchart of the image forming processing executed by the CPU 407. First, internal variables and the like used in the flow are initialized, and the elements in the copying machine are also initialized (step S1). Next, a copy mode set according to a key input by a user is received from an operational panel (not shown) provided at the top of the copying machine (step S2). Next, shading correction for image reading and preprocessing such as preparations of the elements for image forming are performed according to the copy mode (step S3). Next, image data of a document put on the platen glass 107 is read (step S4). Next, image data of the document are coded with generalized block truncation coding, and the code data are stored in the compression image memory 406 (step S5). This "coding" does not mean the coding itself performed with a computer program, but processing for determining compression conditions and data processing after the compression. The processing itself of generalized block truncation coding is performed by a hardware circuit. Then, a block belonging to a dither pattern is detected according to the gradation width index LD, the average information LA and the code data $\phi_{ij}$ obtained by the coding, and gradation width index LD, average information LA and code data $\phi_{ij}$ of the detected block are replaced with the gradation width index LD, the average information LA and the code data $\phi_{ij}$ of a half-tone image at the corresponding density (step S6'). This half-tone processing will be explained later in detail. Next, the code data are read from the compression image memory 406 and recovered to image data by decoding (step S7). Next, a series of image forming processes (a copy job) is controlled according to the decoded image data (step S8). The image forming processes include sensitizing, exposure and development for the photoconductor drum 204, transfer of a toner image onto a sheet of paper and fixing of the toner image. Thus, a uniform density portion in an image is reproduced with multi-level gradations on a sheet of paper. Next, processings such as cleaning of the photoconductor 204 not related directly to the copy operation but necessary to maintain the conditions of the copying machine are performed (step S9). Finally, other processings such as temperature control of the fixing device 223 and communication control of the external input/output port 108 not related directly to the above-mentioned control are executed (step S10). Then, the flow returns to step S1 to repeat the above-mentioned steps S2–S10.

In the half-tone processing (FIG. 8, step S6'), it is decided whether a block of the coded data is a bi-level is image represented as a dither pattern or not. If the block is decided to be a bi-level image represented as a dither pattern, gradation width index LD, average information LA and code data $\phi_{ij}$ of the detected block are replaced with the gradation width index LD, the average information LA and the code data $\phi_{ij}$ obtained with generalized block truncation coding on a half-tone image at the corresponding density.

FIG. 9 shows examples of half-tone images in correspondence to dither patterns and their properties when an image is expressed with (8+1)=9 gradation levels by using dither patterns of 4*4 pixel matrix. The left side in FIG. 9 shows the gradation width index LD, the average information LA and the code data $\phi_{ij}$ of the nine dither patterns. The average information LA has a value of 0, 127 or 255, and the gradation width index LD has a value of 0 or 255. By using these characteristics, it can be decided if a block is a bi-level image or not. The right side in FIG. 9 shows the gradation width index LD, the average information LA and the code data $\phi_{ij}$ for nine half-tone patterns. In the half-tone processing, a dither pattern shown in the left side which exist in a block is replaced with the relevant half-tone pattern shown in the right side.

As explained above, a block expressed with area gradation is detected in the image data based on the gradation width index, average information and code data, and the data of the detected block is rewritten to data of a half-tone image (multi-level image) of the corresponding gradation. When an image is formed, the rewritten data are decoded. Thus, bi-level image data of dither patterns or image expressed with area gradation are converted to multi-level data of a half-tone image. That is, by decoding the rewritten data, the image expressed with area gradation can be replaced with a half-tone image (multi-level image). As explained above, a half-tone image can be obtained by processing not the image data itself, but the data after generalized block truncation coding.

Because a half-tone image is obtained based on the data coded with generalized block truncation coding, a memory having a large capacity enough to store all the bi-level image data is not needed and a memory capacity of the compression image memory 406 needed for the processing is reduced to a ratio of 3/8 relative to that for storing all the image data. Further, because the rewriting to the half-tone image is performed on the data after compression, the number of data for calculation is decreased, and the processing can be performed in a short time. Because the memory capacity used for obtaining the half-tone image is smaller, the processing can be executed with a computer program without using a special hardware circuit.

Figure 10:
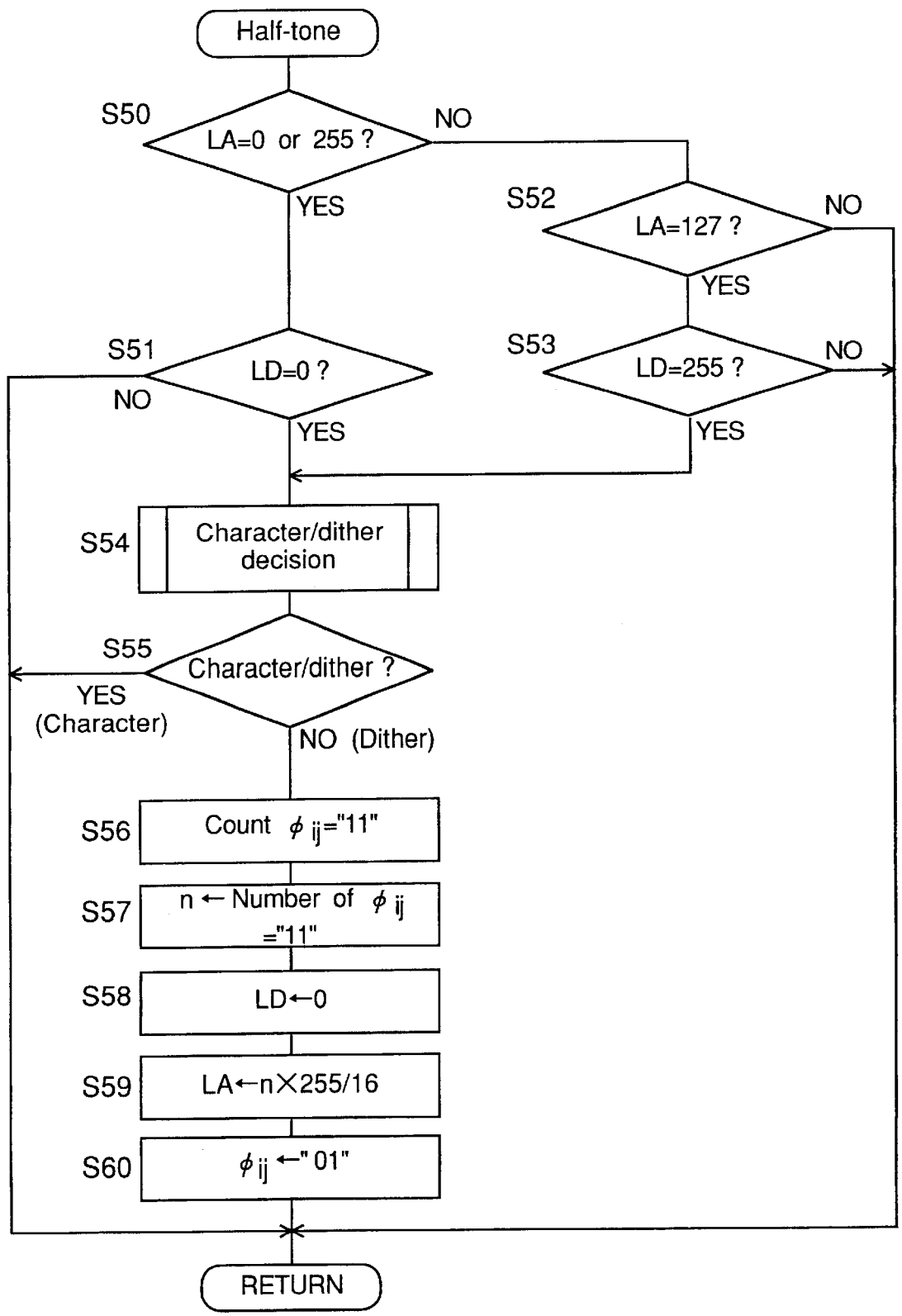
FIG. 10 is a diagram of half-tone patterns and related half-tone images, average information LA, gradation width index LD and code data $\phi_{ij}$ thereof.

FIG. 10 is a flowchart of the half-tone processing (FIG. 8, step S6'). If the average information LA of a block is decided to be either of 0 and 255 (YES at step S50) and if the gradation width index LD of the block is decided to be 0 (YES at step S51), the block is decided to belong to a bi-level image. Similarly, if the average information LA of a block is decided to be 127 (NO at step S50 and YES at step S52) and if the gradation width index LD of the block is decided to be 255 (YES at step S53), the block is also decided to belong to a bi-level image. If the block is not decided to belong to a bi-level image, the flow returns readily. If the block is decided to belong to a bi-level image, it is decided next if the block decided to belong to a bi-level image is a dither pattern or a character pattern (step S54). This discrimination is explained later with reference to FIG. 11. If the block is decided to be a dither pattern, the number of pixels of $\phi^{ij}$="11" is counted (step S56), and the count is set at a variable "n" (step S57). Next, in order to replace the dither pattern with a half-tone pattern, the gradation width index LD is set to zero (step S58), and the average information LA is set to a value of "n"*255/16, where 255 represents the number of 8-bit gradation levels and 16 represents the number of the pixels in the block (step S59), and the code data $\phi_{ij}$ are all set to "01" (step S60).

In the discrimination between dither patterns and character patterns (FIG. 10, step S54), it is decided whether the block decided to belong to a bi-level image is a dither pattern or a character pattern by using a characteristic that character patterns are asymmetric generally while dither patterns are symmetric generally in the vertical and/or horizontal directions in the block of 4*4 pixel matrix. Examples of dither patterns and character patterns are compared in FIG. 11. The left side in FIG. 11 shows seven dither patterns and relevant properties therefor. For each of the seven dither patterns, by dividing the pixel matrix is divided into the left and right sides, the number of black pixels at the left side of the matrix and that at the right side thereof are counted, and a difference between them is calculated. Further, by dividing the pixel matrix into the top and bottom sides, the number of black pixels at the top side of the matrix and that at the bottom side thereof are counted, and a difference between them is calculated. Similarly, the right side in FIG. 11 shows seven character patterns and relevant properties therefor. For each of the seven character patterns, by dividing the pixel matrix into the left and right sides, the number of black pixels at the left side of the matrix and that at the right side thereof are counted, and a difference between them is calculated. Further, by dividing the pixel matrix into the top and bottom sides, the number of black pixels at the top side of the matrix and that at the bottom side thereof are counted, and a difference between them is calculated.

As shown in FIG. 11, for the dither patterns, when the pixel matrix is divided into the left and right sides and into the top and bottom sides, the numbers of black pixels at the right, left, top and bottom sides of the matrix are the same. On the contrary, for the character patterns, when the pixel matrix is divided into the left and right sides or into the top and bottom sides, the numbers of black pixels at the right and left sides, or at the top and bottom sides of the matrix are not the same.

Figure 12:
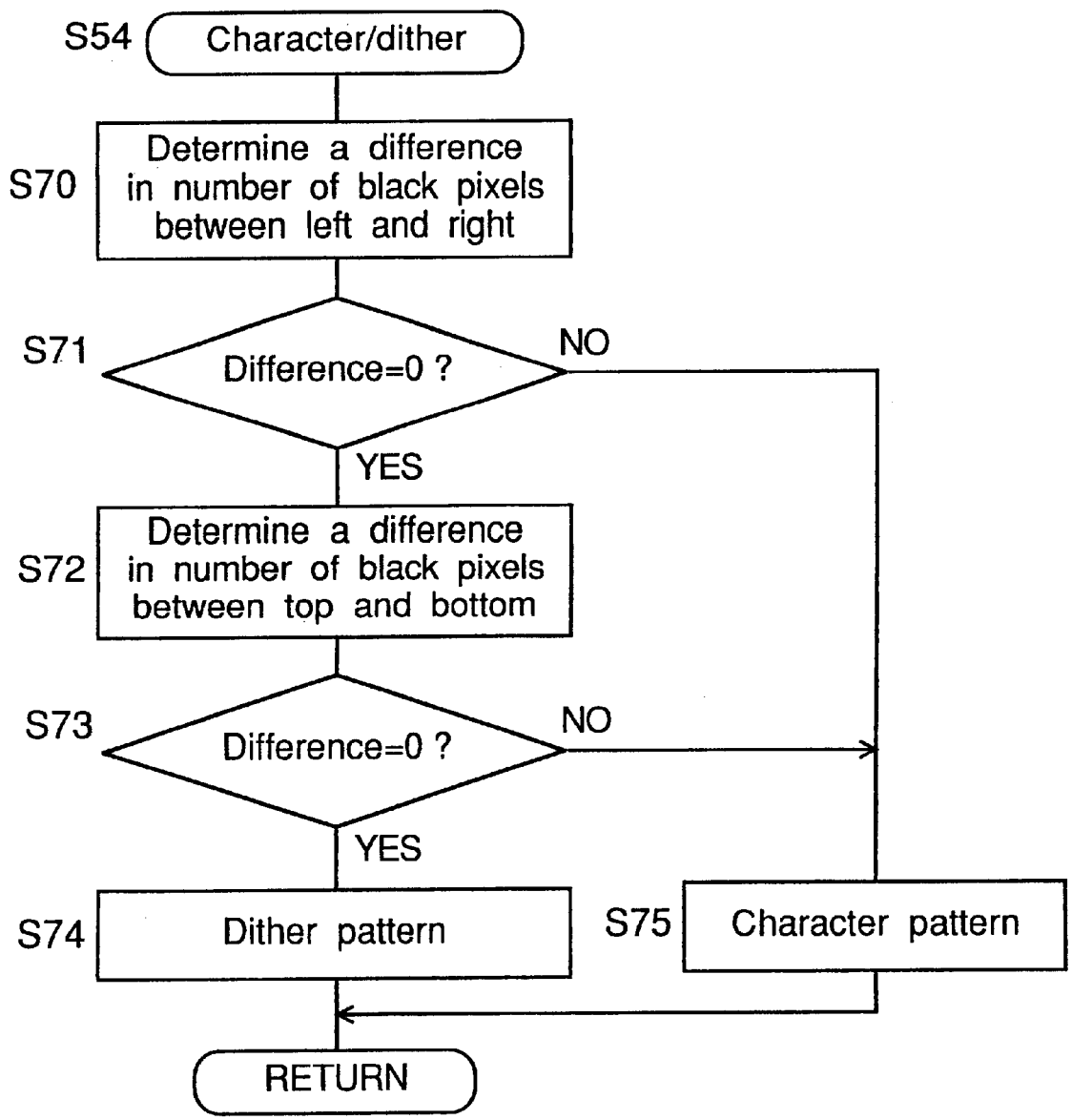
FIG. 12 is a flowchart of discriminating character and dither patterns.

FIG. 12 shows a flowchart of discrimination of character or dither pattern for each block (FIG. 10, step S54). First, by dividing a block of 4*4 pixel matrix into the left and right sides, the numbers of black pixels at the left side of the matrix and that at the right side thereof are counted, and a difference between them is determined (step S70). If the difference is decided not to be zero (NO at step S71), the block is decided to be a character pattern (step S75). If the difference is decided to be zero (YES at step S71), by dividing the block of 4*4 pixel matrix into the top and bottom sides, the numbers of black pixels at the top side of the matrix and that at the bottom side thereof are counted, and a difference between them is determined (step S72). If the difference is decided not to be zero (NO at step S73), the block is decided to be a character pattern (step S75). If the difference is decided to be zero (YES at step S73), the block is decided to be a dither pattern (step S74).

In the embodiments explained above, image data of a document is extracted in the unit of 4*4 matrix block. However, the invention is not limited to blocks of 4*4 pixel matrix, and blocks of, for example, 3*3 pixels or 6*6 pixels may by used. Further, in the embodiments explained below, image data of 256 gradation levels is coded to the code data of four gradation levels, but it may be, for example, eight.

Though generalized block truncation coding is used in the embodiment, coding is not limited to generalized block truncation coding. Any coding may be used if a first feature which characterizes the distribution of the image data and a second feature which characterizes the average thereof are stored with the code data. If it is decided according to the two features that the image of a block is a bi-level image expressed with area gradation such as dither patterns, the coded data thereof are converted to those of half-tone images, without expanding the compressed image data. Thus, the multi-level data of a block of a bi-level image expressed with area gradation image are converted to multi-level data of a half-tone image when they are reproduced on a sheet of paper.

Though the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
   a compressor for compressing digital multi-level image data into compressed multi-level image data; and
   a binarization processor which converts the compressed multi-level image data to compressed bi-level image data without expanding the multi-level image data.

2. The image processor according to claim 1, wherein said compressor compresses the digital multi-level image data in the unit of a block consisting of a predetermined number of pixels.

3. An image processor comprising:
   a binarization processor which converts compressed multi-level image data to compressed bi-level image data without expanding the multi-level image data; and
   a detector for detecting an image of uniform density in the compressed multi-level image data;
   wherein said binarization processor converts the image of uniform density detected by said detector to bi-level image data.

4. An image processor comprising:
   a binarization processor which converts compressed multi-level image data to compressed bi-level image data without expanding the multi-level image data,
   wherein said binarization processor has an expansion processor which expands the compressed bi-level image data converted by said binarization processor.

5. An image processor comprising:
   a binarization processor which converts compressed multi-level image data to compressed bi-level image data without expanding the multi-level image data,
   wherein the compressed multi-level image data have been compressed by generalized block truncation coding.

6. An image processor comprising:
   a multi-level processor which converts compressed bi-level image data to compressed multi-level image data without expanding the bi-level image data.

7. The image processor according to claim 6, further comprising:
   a compressor for compressing the multi-level image data.

8. The image processor according to claim 7, wherein said compressor compresses the bi-level image data in the unit of a block consisting of a predetermined number of pixels.

9. The image processor according to claim 6, further comprising:
   a detector for detecting a bi-level image expressed with area gradation in the compressed multi-level image data;
   wherein said multi-level processor converts the compressed bi-level image expressed with area gradation detected by said detector to compressed multi-level image data.

10. The image processor according to claim 6, wherein said multi-level processor has an expansion processor which expands the multi-level image data converted by said multi-level processor.

11. The image processor according to claim 6, wherein the compressed bi-level image data have been compressed by generalized block truncation coding.

12. An image processor comprising:
    a compression means for compressing image data;
    a discrimination means for discriminating whether the compressed image data compressed by said compression means is a text image or a half-tone image; and
    a conversion means for converting the as-compressed image data to multi-level image data if said discrimination means discriminates that the compressed image data is a half-tone image.

13. The image processor according to claim 12, wherein said compression means compresses the image data by generalized block truncation coding.

14. The image processor according to claims 12, further comprising an expansion means for expanding the compressed multi-level image data converted by said conversion means.

15. An image processor comprising:
    a coding means which divides image data into blocks of predetermined pixel matrix and converts the image data of each block to a first feature which charactrizes distribution of pixel data in the block, a second feature which charactrizes an average of the pixel data and code data for each of the pixel data;
    a memory which stores the first and second features and the code data for each block;
    a detection means for detecting a block in an image of uniform density according to first feature stored in said memory; and
    a data rewrite means for rewriting the first and second features and the code data for each block stored in said memory to first and second features and code data on a predetermined bi-level image in correspondence to a density level specified according to the second feature.

16. An image processor comprising:
    a coding means which divides image data into blocks of predetermined pixel matrix and converts the image data of each block to a first feature which characterizes distribution of pixel data in the block, a second feature which characterizes an average of the pixel data and code data for each of the pixel data;
    a memory which stores the first and second features and the code data for each block;
    a detection means for detecting a block of bi-level image expressed with area gradation in the image data according to the first and second features stored in said memory; and
    a data rewrite means for rewriting the first and second features and the code data for each block stored in said memory to first and second features and code data on a multi-level data of a half-tone image in correspondence to a gradation level specified according to the code data.

17. An image processor comprising:
    an encoder for compression encoding digital multi-level image data into compression encoded multi-level image data; and
    a binarization processor which converts the compression encoded multi-level image data to bi-level image data without expanding the multi-level image data.

18. The image processor according to claim 17, wherein said encoder compression encodes the digital multi-level image data in the unit of a block consisting of a predetermined number of pixels.

* * * * *